R. GARSTANG.
GRASS BURNER.
APPLICATION FILED JULY 6, 1914.
1,124,723.
Patented Jan. 12, 1915.
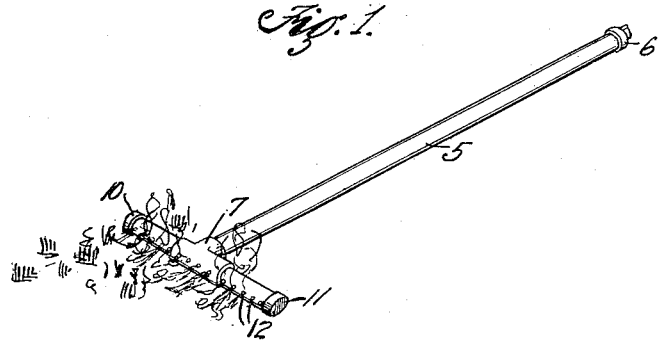
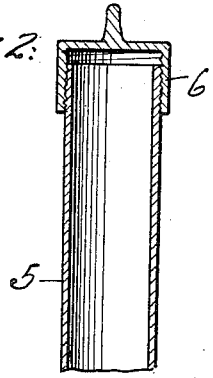
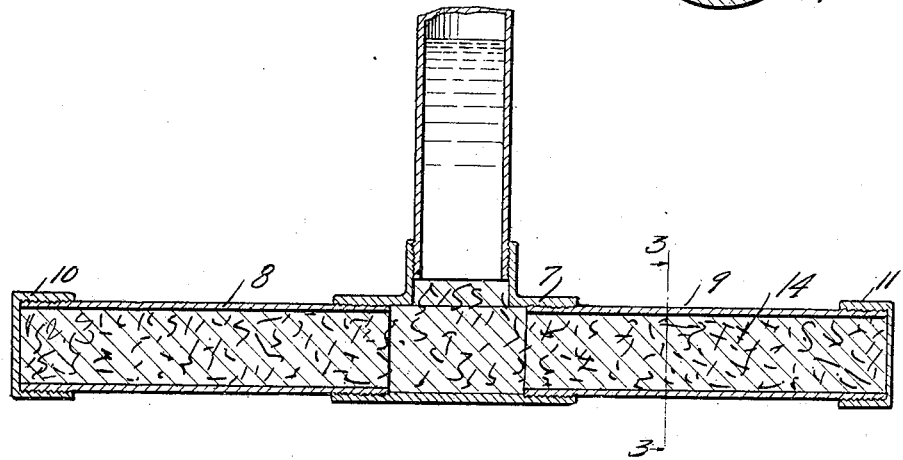
Witnesses:
James M. Abbott
Marguerite Bates
Inventor.
Richard Garstang.
By
Howard & Strause
Attys.

UNITED STATES PATENT OFFICE.

RICHARD GARSTANG, OF LOS ANGELES, CALIFORNIA.

GRASS-BURNER.

1,124,723.  Specification of Letters Patent.  Patented Jan. 12, 1915.

Application filed July 6, 1914. Serial No. 849,167.

*To all whom it may concern:*

Be it known that I, RICHARD GARSTANG, a citizen of the United States, residing at Los Angeles, in the county of Los Angeles, State of California, have invented new and useful Improvements in Grass-Burners, of which the following is a specification.

This invention relates to a grass burner.

It is the object of this invention to provide a burner or torch which can be readily transported from place to place and which is particularly applicable for use in burning grass and underbrush and the use of which facilitates the destruction of weeds and wild growths on vacant lots and roadways, and which is especially adapted for use in back-firing in forest fires, by forest rangers and others.

A further object is to provide a torch of the above character which is simple in construction and economical in manufacture, and which is so formed that the handle will form a reservoir for a liquid fuel employed to form the torch flame.

Another object is to provide a torch adapted to burn liquid fuel without the use of valves and like fuel feeding and controlling mechanisms.

The invention is illustrated in the accompanying drawings, in which:

Figure 1 is a perspective view of the grass burner as in use. Fig. 2 is a vertical section of same, with parts broken away. Fig. 3 is an enlarged detail section on the line 3—3 of Fig. 2.

More specifically, 5 indicates the handle of the torch, which is formed of ordinary tubing or pipe, the outer end of which is externally threaded to receive a cap 6 adapted to be readily removed and replaced thereon.

The lower end of the tubular handle 5 is threaded into a T connection 7 to which are secured oppositely extending pipes 8 and 9, the outer ends of which are closed by means of caps 10 and 11 threaded thereon.

The pipes 8 and 9 and the T 7 form the head of the torch and are provided with a series of alined needle apertures 12 on the faces thereof opposite the connection therewith of the handle 5.

The pipes 8 and 9 and the T 7 are filled with a suitable fibrous material such as asbestos, wool or cotton which is provided for the purpose of preventing too free flow of the hydrocarbon or liquid fuel contained therein and in the tubular handle 5; the fibrous material also serving to prevent back-firing.

In the operation of the invention, the liquid fuel to be burned in the torch is poured into the handle 5 in any desired quantity; the cap 6 being removed for this purpose and afterward replaced.

When the torch is not in use it is inverted with the closed end of the handle down so that the liquid fuel will not seep out of the apertures 12. When in this position the torch may be readily carried from place to place.

When it is desired to light the torch it is turned with the head end downward, thus allowing a quantity of the liquid fuel contained therein, preferably consisting of distillate or other volatile liquid fuel, to feed through the fibrous material 14 contained in the pipes 8 and 9 and T 7 and out the apertures 12. The fuel spreads over the outer surface of the pipes 8 and 9 and the T 7 and is there ignited, thus heating the pipes and generating gas therein which discharges through the needle apertures 12 and there burns in fine jets of flame. The torch may then be dragged over the ground and through the grass and weeds to be burned in such manner that the jets of flame from the torch will operate to burn the weeds and grass close to the ground; the jets of flame being directed horizontally and downwardly as desired so as to confine their action close to the roots and thereby sever the stalks at this point.

The torch may be manipulated to confine its burning action wherever desired and can be effectively controlled to burn only such areas as are required. The device, however, is applicable for general use in firing brush and undergrowths as occasion may require, being especially convenient for the use of forest rangers as it may be readily carried and manipulated when on horse-back.

What I claim is:

A grass burning torch, comprising a T connection, a pair of oppositely extending pipes mounted on said T connection, caps closing the outer ends of said pipes, said pipes and T formed with a series of needle apertures, a packing of fibrous material incased within the T and pipes, a tubular handle connecting with said T forming a reservoir for liquid fuel and in direct open communication with said T and pipes, and a removable closure on the outer end of said handle.

In witness that I claim the foregoing I have hereunto subscribed my name this 11th day of June 1914.

RICHARD GARSTANG.

Witnesses:
 EDMUND A. STRAUSE,
 MARIE BATTEY.

Copies of this patent may be obtained for five cents each, by addressing the "Commissioner of Patents, Washington, D. C."